United States Patent
Kita et al.

(10) Patent No.: US 12,134,677 B2
(45) Date of Patent: Nov. 5, 2024

(54) HYDROPHILIZING AGENT FOR PRODUCTION OF SELF-EMULSIFYING POLYISOCYANATE COMPOSITION, SELF-EMULSIFYING POLYISOCYANATE COMPOSITION, COATING MATERIAL COMPOSITION, AND COATING FILM

(71) Applicants: TOSOH CORPORATION, Yamaguchi (JP); SAGAMI CHEMICAL RESEARCH INSTITUTE, Kanagawa (JP)

(72) Inventors: Motomu Kita, Mie (JP); Shimou Chinson, Kanagawa (JP); Munenori Inoue, Kanagawa (JP); Masahiro Nagaoka, Kanagawa (JP); Hiroaki Adachi, Kanagawa (JP); Aki Maeda, Kanagawa (JP)

(73) Assignees: TOSOH CORPORATION, Yamaguchi (JP); SAGAMI CHEMICAL RESEARCH INSTITUTE, Kanagawa (JP)

( * ) Notice: Subject to any disclaimer, the term of this patent is extended or adjusted under 35 U.S.C. 154(b) by 1014 days.

(21) Appl. No.: 16/975,708

(22) PCT Filed: Feb. 26, 2019

(86) PCT No.: PCT/JP2019/007359
§ 371 (c)(1),
(2) Date: Aug. 25, 2020

(87) PCT Pub. No.: WO2019/167958
PCT Pub. Date: Sep. 6, 2019

(65) Prior Publication Data
US 2020/0399420 A1  Dec. 24, 2020

(30) Foreign Application Priority Data

Feb. 28, 2018  (JP) ................. 2018-034657
Aug. 23, 2018  (JP) ................. 2018-155971

(51) Int. Cl.
C08G 18/79  (2006.01)
C08J 5/18  (2006.01)
C09D 5/02  (2006.01)
C09D 7/63  (2018.01)
C09D 201/00  (2006.01)

(52) U.S. Cl.
CPC ............... *C08G 18/79* (2013.01); *C08J 5/18* (2013.01); *C09D 5/024* (2013.01); *C09D 7/63* (2018.01); *C09D 201/00* (2013.01)

(58) Field of Classification Search
None
See application file for complete search history.

(56) References Cited

U.S. PATENT DOCUMENTS

| | | | |
|---|---|---|---|
| 4,663,377 A | 5/1987 | Hombach et al. | |
| 4,757,105 A * | 7/1988 | Kopp | C08G 18/7825 528/53 |
| 6,767,958 B2 * | 7/2004 | Laas | C08G 18/807 560/25 |
| 2004/0034162 A1 * | 2/2004 | Laas | C08G 18/807 560/330 |
| 2006/0116482 A1 * | 6/2006 | Mundstock | C08G 18/3218 525/266 |
| 2007/0010573 A1 * | 1/2007 | Kong | C07C 307/02 514/553 |
| 2016/0280836 A1 * | 9/2016 | Ji | C08G 18/8083 |
| 2019/0330409 A1 * | 10/2019 | Laas | C08K 5/134 |

FOREIGN PATENT DOCUMENTS

| | | |
|---|---|---|
| CN | 101709108 A | 5/2010 |
| CN | 104448232 A | 3/2015 |
| CN | 105308089 A | 2/2016 |
| JP | 61-291613 A | 12/1986 |

(Continued)

OTHER PUBLICATIONS

Allen, C. F. H., C. F. Murphy, and W. E. Yoerger. "Sultones as Reagents for Derivatizing Aliphatic Amines in Qualitative Organic Analysis." Analytical Chemistry 37.1 (1965): 156-158. (Year: 1965).*
International Search Report and Written Opinion for International Application PCT/JP2019/007359, with translation, 8 pages, mailed May 28, 2019.
Extended European Search Report for European Patent Application No. 19760829.2, 6 pages, dated Nov. 2, 2021.
International Preliminary Report on Patentability for International Application PCT/JP2019/007359, with translation, 6 pages, mailed May 28, 2019.

*Primary Examiner* — Robert S Loewe
(74) *Attorney, Agent, or Firm* — Squire Patton Boggs (US) LLP

(57) ABSTRACT

The present invention relates to a hydrophilizing agent for producing a self-emulsifying polyisocyanate composition, the hydrophilizing agent comprising an anionic compound represented by the following formula (1):

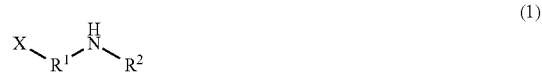

(1)

wherein X represents a sulfo group or a hydroxysulfonyloxy group, $R^1$ represents a straight-chain or branched alkylene group, and $R^2$ represents a straight-chain or branched alkyl group; the total number of carbon atoms included in $R^1$ and $R^2$ is 6 or more and less than 14, and one or two or more carbon atoms in the groups $R^1$ and $R^2$ are optionally replaced with an oxygen atom(s).

5 Claims, No Drawings

(56) References Cited

FOREIGN PATENT DOCUMENTS

| | | |
|---|---|---|
| JP | 9-71720 A | 3/1997 |
| JP | 63-139907 A | 6/1998 |
| JP | 2003-533566 A | 11/2003 |
| JP | 2005-272592 A | 10/2005 |
| JP | 2008-38112 A | 2/2008 |
| JP | 5046584 B2 | 10/2012 |
| JP | 2013-193986 A | 9/2013 |
| JP | 5935423 B2 | 6/2016 |
| JP | 2018-119107 A | 8/2018 |
| JP | 2019-147907 A | 9/2019 |
| WO | WO 2001/088006 A1 | 11/2001 |
| WO | WO 2017/042111 A1 | 3/2017 |

* cited by examiner

HYDROPHILIZING AGENT FOR PRODUCTION OF SELF-EMULSIFYING POLYISOCYANATE COMPOSITION, SELF-EMULSIFYING POLYISOCYANATE COMPOSITION, COATING MATERIAL COMPOSITION, AND COATING FILM

CROSS-REFERENCE TO RELATED APPLICATIONS

This application is a National Stage filing under 35 U.S.C. § 371 of International Patent Application No. PCT/JP2019/007359, filed Feb. 26, 2019 and entitled "HYDROPHILIZING AGENT FOR PRODUCTION OF SELF-EMULSIFYING POLYISOCYANATE COMPOSITION, SELF-EMULSIFYING POLYISOCYANATE COMPOSITION, COATING MATERIAL COMPOSITION, AND COATING FILM," which claims the benefit of priority to JP Application No. 2018-155971, filed Aug. 23, 2018, and further claims the benefit of priority to JP Application No. 2018-034657, filed Feb. 28, 2018, these applications of which are herein incorporated by reference in their entirety for all purposes.

TECHNICAL FIELD

The present invention relates to a hydrophilizing agent for producing a self-emulsifying polyisocyanate composition. The present invention also relates to a self-emulsifying polyisocyanate composition, a coating material composition obtained therefrom and a coating film thereof.

BACKGROUND ART

Conventionally, a polyisocyanate has been known as the component of a curable composition used for adhesives, coating materials or the like. For example, in Patent Literature 1, a hydrophobic polyisocyanate having an isocyanurate structure is modified with a nonionic hydrophilic group-containing monofunctional alcohol compound, and emulsified/dispersed in water for use. For example, in Patent Literature 2, disclosed is a modified polyisocyanate obtained by modifying a polyisocyanate with an anionic hydrophilic group-containing amine to facilitate dispersion in water.

CITATION LIST

Patent Literature

Patent Literature 1: Japanese Unexamined Patent Publication No. S61-291613
Patent Literature 2: Japanese Unexamined Patent Publication No. 2003-533566

SUMMARY OF INVENTION

Technical Problem

The composition described in Patent Literature 1 has the following problem: a strong shearing force by high-speed stirring or the like is required to uniformly incorporate the polyisocyanate into an aqueous medium. Also, in the case where no strong shearing force by high-speed stirring or the like is applied during dispersion of the polyisocyanate in an aqueous medium, a problem is that the proportion of the polyisocyanate dispersed in water (hereinafter referred to as "degree of water dispersion") is low. In the case of the composition including the modified polyisocyanate described in Patent Literature 2, the degree of water dispersion of the polyisocyanate is insufficient without application of a strong shearing force by high-speed stirring or the like due to high viscosity. Also, the resulting coating material has the following problem: the dispersion stability is insufficient, causing sedimentation of the self-emulsifying polyisocyanate component dispersed in water.

An object of the present invention is to provide a hydrophilizing agent for producing a self-emulsifying polyisocyanate composition, capable of improving the degree of water dispersion and the stability of water dispersion of a coating material. Another object of the present invention is to provide a self-emulsifying polyisocyanate composition excellent in the degree of water dispersion and the stability of water dispersion of a coating material without requirement of a strong shearing force by high-speed stirring or the like during dispersion in an aqueous medium.

Solution to Problem

As a result of intensive studies, the present inventors have found that the problem can be solved by a self-emulsifying polyisocyanate composition that is a product obtained from a specific anionic compound (a), an organic polyisocyanate (b), and an amine compound (c), so that the present invention has been developed.

In other words, the present invention includes embodiments shown in the following items [1] to [9].

[1] A hydrophilizing agent for producing a self-emulsifying polyisocyanate composition, the hydrophilizing agent comprising an anionic compound represented by the following formula (1):

(1)

wherein X represents a sulfo group or a hydroxysulfonyloxy group, $R^1$ represents a straight-chain or branched alkylene group, and $R^2$ represents a straight-chain or branched alkyl group; the total number of carbon atoms included in $R^1$ and $R^2$ is 6 or more and less than 14, and one or two or more carbon atoms in the groups $R^1$ and $R^2$ are optionally replaced with an oxygen atom(s).

[2] A self-emulsifying polyisocyanate composition comprising a reaction product of an anionic compound represented by the following formula (1) and an organic polyisocyanate:

(1)

wherein X represents a sulfo group or a hydroxysulfonyloxy group, $R^1$ represents a straight-chain or branched alkylene group, and $R^2$ represents a straight-chain or branched alkyl group; the total number of carbon atoms included in $R^1$ and $R^2$ is 6 or more and less than 14, and one or two or more carbon atoms in the groups $R^1$ and $R^2$ are optionally replaced with an oxygen atom(s).

[3] The self-emulsifying polyisocyanate composition according to item [2], further comprising an amine compound.

[4] The self-emulsifying polyisocyanate composition according to item [2] or [3], wherein the anionic compound is represented by the following formula (2):

(2)

wherein $R^3$ represents a straight-chain alkyl group; one or two or more carbon atoms in the group $R^3$ are optionally replaced with an oxygen atom; and the number of carbon atoms included in $R^3$ is 3 or more and 6 or less.

[5] The self-emulsifying polyisocyanate composition according to item [4], wherein the self-emulsifying polyisocyanate composition has a sulfo group content of 0.10 to 0.35 mmol/g.

[6] The self-emulsifying polyisocyanate composition according to any one of items [2] to [5], wherein a mass fraction of an isocyanate group in the organic polyisocyanate is 10 to 35% based on the total mass of the self-emulsifying polyisocyanate composition.

[7] The self-emulsifying polyisocyanate composition according to any one of items [2] to [6], wherein the organic polyisocyanate contains an isocyanurate-modified polyisocyanate of hexamethylene diisocyanate.

[8] A coating material composition comprising a mixture of the self-emulsifying polyisocyanate composition according to any one of items [2] to [7] and a main agent.

[9] A coating film formed from the coating material composition according to item [8].

Advantageous Effects of Invention

According to the present invention, it becomes possible to provide a hydrophilizing agent for producing a self-emulsifying polyisocyanate composition, capable of improving the degree of water dispersion and the stability of water dispersion of a coating material. According to the present invention, it becomes possible to provide a self-emulsifying polyisocyanate composition excellent in the degree of water dispersion and the stability of water dispersion of a coating material without requirement of a strong shearing force by high-speed stirring or the like during dispersion in an aqueous medium.

Further, according to the present invention, it is possible to obtain a self-emulsifying polyisocyanate composition capable of forming a coating film excellent in the stability of water dispersion, gloss, and hardness.

DESCRIPTION OF EMBODIMENTS

Hereinafter, preferred embodiments of the present invention will be described in detail. The present invention, however, is not limited to the following embodiments.

<Hydrophilizing Agent>

The hydrophilizing agent in an embodiment includes an anionic compound represented by the following formula (1). The hydrophilizing agent is a hydrophilizing agent for producing a self-emulsifying polyisocyanate composition for use in production of a self-emulsifying polyisocyanate composition. With use of a hydrophilizing agent as component of the self-emulsifying polyisocyanate composition, hydrophilicity can be imparted to an organic polyisocyanate. The hydrophilizing agent in the present embodiment can improve the degree of water dispersion and the stability of water dispersion of a coating material. Furthermore, according to the hydrophilizing agent of the present embodiment, a coating film excellent in the gloss and the hardness can be formed.

(1)

In the formula (1), X represents a sulfo group or a hydroxysulfonyloxy group, $R^1$ represents a straight-chain or branched alkylene group, and $R^2$ represents a straight-chain or branched alkyl group. The total number of carbon atoms included in $R^1$ and $R^2$ is 6 or more and less than 14, and one or two or more carbon atoms in the groups $R^1$ and $R^2$ are optionally replaced with an oxygen atom(s).

The number of carbon atoms in the alkylene group represented by $R^1$ may be, for example, 1 or more or 2 or more, and may be 10 or less, 8 or less, 6 or less, or 4 or less. The number of carbon atoms in the alkylene group represented by $R^1$ may be, for example, 1 to 10, 1 to 8, 1 to 6, 1 to 4, 2 to 10, 2 to 8, 2 to 6, or 2 to 4.

Examples of the straight-chain or branched alkylene group represented by $R^1$ include a methylene group, an ethylene group, a trimethylene group, a tetramethylene group, a pentamethylene group, a hexamethylene group, a heptamethylene group, an octamethylene group, and 2,2-dimethyltetramethylene group. One or two or more carbon atoms in the alkylene group $R^1$ are optionally replaced with an oxygen atom(s). In the case where two or more carbon atoms in the alkyl group are replaced with oxygen atoms, the oxygen atoms must be located not adjacent to each other in the replacement. Examples thereof include 2-oxatrimethylene group, 2-oxatetramethylene group, 3-oxatrimethylene group, 2-oxapentamethylene group, 3-oxapentamethylene group, and 3,6-dioxaoctamethylene group.

The number of carbon atoms in the alkyl group represented by $R^2$ may be, for example, 1 or more, 2 or more, or 3 or more, and may be 10 or less, 8 or less, 6 or less, or 4 or less.

Examples of the straight-chain or branched alkyl group represented by $R^2$ include a methyl group, an ethyl group, a propyl group, an isopropyl group, a butyl group, an isobutyl group, a sec-butyl group, a tert-butyl group, a pentyl group, a hexyl group, a heptyl group, and an octyl group.

One or two or more carbon atoms in the alkyl group represented by $R^2$ are optionally replaced with an oxygen atom(s). In the case where two or more carbon atoms in the alkyl group are replaced with oxygen atoms, the oxygen atoms must be located not adjacent to each other in the replacement. Examples thereof include 2-methoxyethyl group, 2-ethoxyethyl group, 2-propoxyethyl group, 3-methoxypropyl group, 3-ethoxypropyl group, 3-propoxypropyl group, 4-methoxybutyl group, 4-ethoxybutyl group, 4-propoxybutyl group, 2-(2-methoxyethoxy)ethyl group, and 2-(2-ethoxyethoxy)ethyl group.

The total number of carbon atoms included in $R^1$ and $R^2$ is 6 or more and less than 14. The total number of carbon atoms included in $R^1$ and $R^2$ may be, for example, 13 or less, 12 or less, 11 or less, 10 or less, 9 or less, 8 or less, or 7 or less, and may be 7 or more.

It is preferable that the anionic compound be a compound represented by the following formula (2), wherein $R^1$ is a trimethylene group, $R^2$ is a straight-chain alkyl group, and X is a sulfo group.

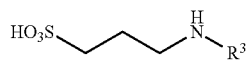

(2)

In the formula (2), $R^3$ represents a straight-chain alkyl group, with one or two or more carbon atoms in the group $R^3$ being replaceable with an oxygen atom(s), and the number of carbon atoms included in $R^3$ being 3 or more and 6 or less.

Examples of the straight-chain alkyl group represented by $R^3$ include a propyl group, a butyl group, a pentyl group, and a hexyl group.

One or two or more carbon atoms in the alkyl group represented by $R^3$ are optionally replaced with an oxygen atom(s). In the case where two or more carbon atoms in the alkyl group are replaced with oxygen atoms, the oxygen atoms must be located not adjacent to each other in the replacement. Examples thereof include 2-methoxyethyl group, 2-ethoxyethyl group, 2-propoxyethyl group, 3-methoxypropyl group, 3-ethoxypropyl group, and 4-methoxybutyl group. The number of carbon atoms included in $R^3$ is 3 or more and 6 or less.

Examples of the anionic compound having $R^1$ and $R^2$ described above include 3-(propylamino)propanesulfonic acid, 3-(butylamino)propane sulfonic acid, 3-[(3-methoxypropyl)amino]propanesulfonic acid, 3-[(3-ethoxypropyl)amino]propanesulfonic acid, 3-(hexylamino)propanesulfonic acid, 3-(octylamino)propanesulfonic acid, 3-(tert-butylamino)propanesulfonic acid, 4-(propylamino)butanesulfonic acid, 4-(butylamino)butanesulfonic acid, 4-[(3-methoxypropyl)amino]butanesulfonic acid, 4-[(3-ethoxypropyl)amino]butanesulfonic acid, 4-(hexylamino)butanesulfonic acid, 4-(octylamino)butanesulfonic acid, 4-(tert-butylamino)butanesulfonic acid, 5-(propylamino)pentanesulfonic acid, 5-(butylamino)pentanesulfonic acid, 5-[(3-methoxypropyl)amino]pentanesulfonic acid, 5-[(3-ethoxypropyl)amino]pentanesulfonic acid, 5-(hexylamino)pentanesulfonic acid, 5-(octylamino)pentanesulfonic acid, 5-(tert-butylamino)pentanesulfonic acid, 6-(propylamino)hexanesulfonic acid, 6-(butylamino)hexanesulfonic acid, 6-[(3-methoxypropyl)amino]hexanesulfonic acid, 6-[(3-ethoxypropyl)amino]hexanesulfonic acid, 6-(hexylamino)hexanesulfonic acid, 8-[(3-methoxypropyl)amino]octanesulfonic acid, 2-[2-(tert-butylamino)ethoxy]ethanesulfonic acid, 2-[2-(propylamino)ethoxy]ethanesulfonic acid, 2-[2-(butylamino)ethoxy]ethanesulfonic acid, 2-[2-[(3-methoxypropyl)amino]ethoxy]ethanesulfonic acid, 2-[2-[(3-ethoxypropyl)amino]ethoxy]ethanesulfonic acid, 2-[2-(hexylamino)ethoxy]ethanesulfonic acid, 2-[2-(octylamino)ethoxy]ethanesulfonic acid, 3-(propylamino)propyl sulfate, 3-[(3-methoxypropyl)amino]propyl sulfate, 3-[(3-ethoxypropyl)amino]propyl sulfate, 3-(hexylamino)propyl sulfate, 3-(tert-butylamino)propyl sulfate, 4-(propylamino)butyl sulfate, 4-[(3-methoxypropyl)amino]butyl sulfate, 4-[(3-ethoxypropyl)amino]butyl sulfate, 4-(hexylamino)butyl sulfate, and 4-(tert-butylamino)butyl sulfate, and it is preferable that at least one selected from the group be used.

The anionic compound (a) represented by the formula (1) allows the active hydrogen of the sulfo group or hydroxysulfonyloxy group in a molecule to be neutralized with the amine in the molecule, so that an inner-salt (1a) or an inner-salt (1b) may be formed. The anionic compound (a) includes any one of the inner-salts. In the present specification, the anionic compound (a) of the present invention is represented as the formula (1).

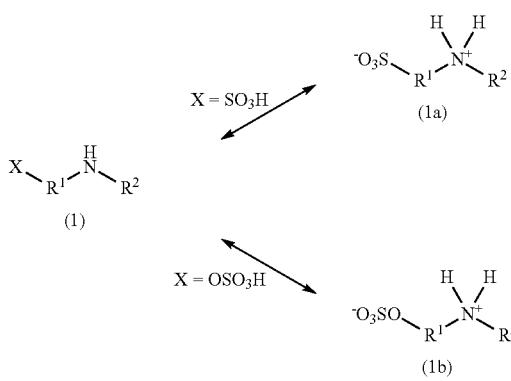

In the formula, $R^1$, $R^2$ and X represent the same meaning as described above.

The anionic compound represented by the formula (2) allows the active hydrogen of the sulfo group in a molecule to be neutralized with the amine in the molecule, so that an inner-salt represented by a formula (2a) may be formed. The anionic compound includes an inner-salt represented by the formula (2a).

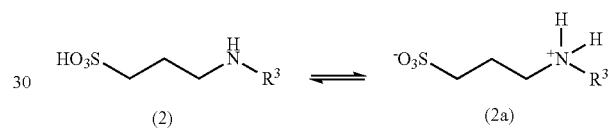

In the formula, $R^3$ represents the same meaning as described above.

The anionic compound (a) can be prepared, for example with reference to a method described in literature (for example, U.S. Patent Application Publication No. 2007/0010573).

<Self-Emulsifying Polyisocyanate Composition>

The self-emulsifying polyisocyanate composition in an embodiment includes a reaction product of an anionic compound (a) and an organic polyisocyanate (b). The self-emulsifying polyisocyanate composition may further include an amine compound (c) in addition to the reaction product. In other words, the self-emulsifying polyisocyanate composition may be obtained from the anionic compound (a), the organic polyisocyanate (b), and the amine compound (c). The anionic compound (a) is as described above, and may be, for example, a compound represented by the formula (2).

In the self-emulsifying polyisocyanate composition, the content of a group represented by X may be 0.10 to 0.35 mmol/g. With a content of the group represented by X within the range, a coating material having an improved degree of water dispersion and excellent stability of water dispersion can be obtained. In the self-emulsifying polyisocyanate composition, the sulfo group content may be within the above range. The content of the group represented by X is an amount of substance (unit mmol) per 1 g of the self-emulsifying polyisocyanate composition.

[Organic Polyisocyanate (b)]

The organic polyisocyanate (b) means a compound having two or more isocyanate groups (—NCO). The number of isocyanate groups in the organic polyisocyanate (b) may be, for example, 2 to 5, 2 to 4, or 2 to 3.

Examples of the organic polyisocyanate (b) include organic polyisocyanates selected from aromatic polyisocyanates, araliphatic polyisocyanates, aliphatic polyisocyanates, and alicyclic polyisocyanates. Also, isocyanurate-modified polyisocyanates, allophanate-modified polyisocyanates, uretdione-modified polyisocyanates, urethane-modified polyisocyanates, biuret-modified polyisocyanates, uretonimine-modified polyisocyanates, and acylurea-modified polyisocyanates thereof may be appropriately used alone or in combination of two or more. In consideration of weather resistance, aliphatic polyisocyanates, alicyclic polyisocyanates, and modified polyisocyanates thereof are preferred, and from the viewpoint of durability of the coating film and adhesion to a substrate, it is preferable to use at least one selected from the group consisting of isocyanurate-modified polyisocyanates and allophanate-modified polyisocyanates of aliphatic polyisocyanates or alicyclic polyisocyanates. From the viewpoint of gloss, it is preferable to use at least one selected from the group consisting of isocyanurate-modified polyisocyanates and allophanate-modified polyisocyanates of hexamethylene diisocyanates.

(Aromatic Polyisocyanate)

Examples of the aromatic polyisocyanates include 2,4-tolylene diisocyanate, 2,6-tolylene diisocyanate, a 2,4-tolylene diisocyanate/2,6-tolylene diisocyanate mixture, 4,4'-diphenylmethane diisocyanate, 2,4'-diphenylmethane diisocyanate, a 2,4'-diphenylmethane diisocyanate/4,4'-diphenylmethane diisocyanate mixture, m-xylylene diisocyanate, p-xylylene diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxydiphenyl-4,4'-diisocyanate.

(Araliphatic Polyisocyanate)

Examples of the araliphatic polyisocyanates include 1,3-xylylene diisocyanate, 1,4-xylylene diisocyanate, or a mixture thereof; 1,3-bis(1-isocyanato-1-methylethyl)benzene, 1,4-bis(1-isocyanato-1-methylethyl)benzene, or a mixture thereof; and ω,ω'-diisocyanato-1,4-diethylbenzene.

(Aliphatic Polyisocyanate)

Examples of the aliphatic polyisocyanate include hexamethylene diisocyanate, tetramethylene diisocyanate, 2-methylpentane-1,5-diisocyanate, 3-methylpentane-1,5-diisocyanate, lysine diisocyanate, trioxyethylene diisocyanate, ethylene diisocyanate, trimethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatomethyloctane, 2,5,7-trimethyl-1,8-diisocyanate-5-isocyanatomethyloctane, bis(isocyanatoethyl)carbonate, bis(isocyanatoethyl)ether, 1,4-butylene glycol dipropyl ether-α,α'-diisocyanate, lysine diisocyanatomethyl ester, 2-isocyanatoethyl-2,6-diisocyanate hexanoate, and 2-isocyanatopropyl-2,6-diisocyanate hexanoate.

(Alicyclic Polyisocyanate)

Examples of the alicyclic polyisocyanates include isophorone diisocyanate, cyclohexyl diisocyanate, bis(isocyanatomethyl)cyclohexane, dicyclohexylmethane diisocyanate, methylcyclohexane diisocyanate, dicyclohexyldimethylmethane diisocyanate, 2,2'-dimethyldicyclohexylmethane diisocyanate, bis(4-isocyanate-n-butylidene)pentaerythritol, hydrogenated dimer acid diisocyanate, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-5-(2-isocyanatoethyl)-bicyclo-[2.2.1]-heptane, 2-isocyanatomethyl-3-(3-isocyanatopropyl)-6-(2-isocyanatoethyl)-bicyclo-[2.2.1]-heptane, 2-isocyanatomethyl-2-(3-isocyanatopropyl)-5-(2-isocyanate)ethyl)-bicyclo-[2.2.1]-heptane, 2-isocyanatomethyl-2-(3-isocyanatopropyl)-6-(2-isocyanatoethyl)-bicyclo-[2.2.1]-heptane, 2,5-bis(isocyanatomethyl)-bicyclo[2.2.1]-heptane, hydrogenated diphenylmethane diisocyanate, norbornane diisocyanate, hydrogenated tolylene diisocyanate, hydrogenated xylene diisocyanate, and hydrogenated tetramethylxylene diisocyanate.

The mass fraction of the isocyanate group in the organic polyisocyanate (b) is preferably 10 to 35 mass %, more preferably 15 to 24 mass %, based on the total mass of the self-emulsifying polyisocyanate composition.

[Amine Compound (c)]

It is preferable that a tertiary amine be used as the amine compound (c). Examples of the tertiary amine include tertiary monoamines such as trimethylamine, triethylamine, tripropylamine, tributylamine, dimethylcyclohexylamine, N-methylmorpholine, N-ethylmorpholine, N-methylpiperidine, N-ethylpiperidine, dimethylethanolamine, methyldiethanolamine, and triethanolamine, or tertiary diamines such as 1,3-bis(dimethylamino)propane, 1,4-bis(dimethylamino)butane and N,N'-dimethylpiperazine. In particular, from the viewpoint of low reactivity to isocyanates, tertiary monoamines are preferred, and tributylamine, dimethylcyclohexylamine, and N-methylmorpholine are more preferred.

The amine compound (c) is used to have a molar equivalent ratio between the amino group and the anionic compound (a) contained in the amine compound (c) of preferably 0.2 to 2.0, more preferably 0.5 to 1.5.

<Viscosity of Self-Emulsifying Polyisocyanate Composition>

The viscosity of the self-emulsifying polyisocyanate composition may be, for example, 35000 mPa·s or less, 10000 mPa·s or less, or 9000 mPa·s or less at 25° C., and may be 2000 mPa·s or more, or 2500 mPa·s or more. The viscosity of the self-emulsifying polyisocyanate composition is a value measured by the method described in Examples.

<Production of Self-Emulsifying Polyisocyanate Composition>

In producing a self-emulsifying polyisocyanate composition, the compounding sequence and the compounding ratio of the anion compound (a), the organic polyisocyanate (b), and the amine compound (c), and whether a solvent is used in compounding are not particularly limited, and, for example, conditions for a normal urethanization reaction may be applied.

The method for producing a self-emulsifying polyisocyanate in an embodiment may include a step of mixing the anion compound (a), the organic polyisocyanate (b), and the amine compound (c) (mixing step). In the mixing step, the mixture of the anion compound (a), the organic polyisocyanate (b), and the amine compound (c) may be heated. The temperature of the mixture in the mixing step may be, for example, 50 to 95° C., 60 to 90° C., or 70 to 85° C. In the mixing step, the time in which the temperature is maintained at the temperature (mixing time) may be, for example, 1 to 10 hours, 2 to 8 hours, or 3 to 7 hours. In the mixing step, other additives described below may be added on an as needed basis.

<Coating Material Composition>

Next, the coating material composition will be described. The coating material composition in the present embodiment is obtained from the self-emulsifying polyisocyanate composition described above and a main agent. The coating material composition in the present embodiment includes a mixture of a self-emulsifying polyisocyanate composition and a main agent. The coating material composition may include a reaction product of the self-emulsifying polyisocyanate composition described above and a main agent. The coating material composition may include a mixture of the anion compound (a), the organic polyisocyanate (b) and the amine compound (c), and a main agent in an unreacted state. In other words, the coating material composition may include a mixture of the anion compound (a), the organic polyisocyanate (b) and the amine compound (c), and a main agent. Examples of the reaction product of the self-emulsifying polyisocyanate composition and a main agent include a urethane resin and a polyurea resin. In other words, the coating material composition may include a urethane resin, a polyurea resin and the like, as a reaction product of the self-emulsifying polyisocyanate and the main agent.

The main agent has a group reactable with an isocyanate group in a molecule (hereinafter also referred to as "nucleophilic group"). Examples of the nucleophilic group include a hydroxyl group, a carboxyl group, and an amino group. It is preferable that the main agent contain a hydroxyl group, a carboxyl group, or an amino group as nucleophilic group. The main agent may contain two or more nucleophilic groups per molecule. The main agent may be a polymer compound. The main agent may be in a liquid state at room temperature, and may be insoluble in water or may have no affinity with water. As the main agent, a polymer compound in a liquid state at room temperature, which is insoluble in water or has no affinity with water, may be used. As the main agent, for example, a water-soluble resin having solubility or a certain degree of affinity with water, or an aqueous emulsion may be used. Even in the case where the main agent (for example, a polymer compound) contains only a few nucleophilic groups that can react with isocyanate groups, the self-emulsifying polyisocyanate composition eventually reacts with water to make a polyurea compound, so that a hard and tough coating film can be obtained. Since the isocyanate group reacts with the nucleophilic group present on the surface of an adherend, the adhesion to the adherent is also improved. Incidentally, in the case where a polymer compound having a nucleophilic group reactable with an isocyanate group at room temperature is used, the nucleophilic group in the polymer compound reacts with the isocyanate group in the self-emulsifying polyisocyanate composition to form a crosslink structure, so that weather resistance, solvent resistance and the like are further improved. Incidentally, in the present specification, the normal temperature refers to 5° C. to 40° C.

Examples of the main agents include saturated or unsaturated polyester polyols, polycaprolactone polyols, saturated or unsaturated fatty acid-modified alkyd polyols, amino alkyd polyols, polycarbonate polyols, acrylic polyols, polyether polyols, epoxy polyols and fluorine-containing polyols, and further include saturated or unsaturated polyester resins, polycaprolactone resins, fatty acid-modified alkyd resins, amino alkyd resins, polycarbonate resins, acrylic resins, polyether resins, epoxy resins, polyurethane resins, cellulose acetate butyrate resins, and fluorine-containing resins.

Water-soluble resins and water-based emulsions can also be suitably used as the main agent, and examples of the water-soluble resins include polyvinyl alcohols, polyethylene oxides, water-soluble ethylene-vinyl acetate copolymers, water-soluble acrylic resins, water-soluble epoxy resins, water-soluble cellulose derivatives, water-soluble polyesters, water-soluble lignin derivatives, water-soluble fluororesins, and water-soluble silicone resins.

The water-based emulsions include all of the so-called latexes and emulsions, and examples thereof include rubber latexes such as styrene butadiene copolymer latexes, acrylonitrile butadiene copolymer latexes, methyl methacrylate butadiene copolymer latexes, chloroprene latexes, polybutadiene latexes, polyacrylate ester latexes, polyvinylidene chloride latexes, polybutadiene latexes, or carboxyl-modified products of these latexes, and polyvinyl chloride emulsions, urethane acrylic emulsions, silicone acrylic emulsions, vinyl acetate acrylic emulsions, polyurethane emulsions, and acrylic emulsions.

Among these, in terms of coating film performance such as gloss and weather resistance and/or adhesive strength, acrylic polyols, acrylic resins, water-soluble acrylic resins, acrylic emulsions, urethane acrylic emulsions, or polyurethane emulsions may be particularly favorably used.

The number average molecular weight of the polymer compound as the main agent is preferably 1000 to 1000000, and more preferably 10000 to 100000. The number average molecular weight can be determined, for example, as a value converted based on a standard polystyrene calibration curve through measurement by gel permeation chromatography.

<Compounding Ratio>

Regarding the compounding ratio between the self-emulsifying polyisocyanate composition and the main agent, the molar ratio between the isocyanate group in the self-emulsifying polyisocyanate composition and the nucleophilic group in the main agent (isocyanate group:nucleophilic group) is preferably 9:1 to 1:9, more preferably 6:4 to 4:6. Within the range, a coating film having superior performance can be obtained.

In the case of using a main agent having only a few nucleophilic groups in the molecule, the mass ratio between the self-emulsifying polyisocyanate composition and the main agent (self-emulsifying polyisocyanate composition: main agent) is preferably 1:9 to 5:5, more preferably 1:9 to 3:7. Within the range, a coating film having superior performance can be obtained.

<Compounding Method>

Examples of the compounding method of the main agent and the self-emulsifying polyisocyanate composition include addition directly to the main agent, addition after dispersion of the self-emulsifying polyisocyanate composition in water, and addition after dissolution in a solvent commonly used in the urethane industry. The compounding method in which the self-emulsifying polyisocyanate composition is dispersed in water and then added to the main agent is preferred.

<Other Additives>

In the self-emulsifying polyisocyanate composition or the coating material composition, for example, additives such as an antioxidant, an ultraviolet absorber, a pigment, a dye, a flame retardant, a hydrolysis inhibitor, a lubricant, a plasticizer, and a filler, a storage stabilizer and a film-forming aid may be appropriately compounded on an as needed basis.

<Coating Method>

The coating material composition may be applied by a conventional coating method to obtain a coating film. In an embodiment of the present invention, a coating film formed from a coating material composition is provided. The coating film may be formed by drying the coating material composition. In the application, an airless sprayer, an air sprayer, an electrostatic coater, dipping, a roll coater, a knife coater, a brush, or the like may be used.

An embodiment of the present invention is also regarded to be a method of hydrophilizing a self-emulsifying polyisocyanate composition including adding the above-mentioned anionic compound (a) to a raw material. The raw material is a raw material for producing the self-emulsifying polyisocyanate composition, and examples thereof include the organic polyisocyanate (b), the amine compound (c), and other additives as described above. Various conditions in the method may be the same as described above.

In an embodiment of the present invention, use of the anionic compound described above is provided for producing the hydrophilizing agent. In another embodiment of the present invention, the anionic compound described above is provided for use in a hydrophilizing agent. The various conditions in these embodiments may be the same as described above.

EXAMPLES

The present invention is further described in detail with reference to Examples, though the present invention is not limited thereto.

[Production of Anionic Compound]

Synthesis Example 1

In a 200-mL flask equipped with a reflux tube, 1,3-propane sultone (6.02 g, 49.1 mmol) and propylamine (4.00 mL, 48.5 mmol) were weighed and dissolved in tetrahydrofuran (44 mL). The reaction solution was refluxed for 11 hours under an argon atmosphere, and volatile components were then removed. A solid obtained was recrystallized from ethanol, and a precipitated white precipitate was collected by filtration, washed with tetrahydrofuran, and dried at 60° C. under reduced pressure to give 3-(propylamino)propanesulfonic acid (A-1) (4.55 g, 25.1 mmol, 51%). $^1$H NMR (400 MHz, DMSO-d6) δ (ppm): 8.48 (br, 2H), 3.05 (t, J=6.7 Hz, 2H), 2.84 (m, 2H), 2.62 (m, 2H), 1.93 (tt, J=6.5, 6.7 Hz, 2H), 1.57 (tq, J=7.7, 7.5 Hz, 2H), 0.91 (t, J=7.5 Hz, 3H).

Synthesis Example 2

Into a 200-mL flask equipped with a reflux tube, 1,3-propane sultone (6.72 g, 55.0 mmol), butylamine (11.0 mL, 111 mmol) and tetrahydrofuran (60 mL) were added to give 3-(butylamino)propanesulfonic acid (A-2) (5.20 g, 26.6 mmol, 48%), by the same method as in Synthesis Example 1. $^1$H NMR (400 MHz, DMSO-d6) δ (ppm): 8.49 (brs, 2H), 3.04 (t, J=6.4 Hz, 2H), 2.87 (m, 2H), 2.62 (m, 2H), 1.92 (m, 2H), 1.52 (m, 2H), 1.32 (m, 2H), 0.89 (t, J=7.4 Hz, 3H).

Synthesis Example 3

In a 200-mL flask equipped with a reflux tube, 1,3-propane sultone (10.1 g, 82.7 mmol) and (3-methoxypropyl) amine (12.6 mL, 123 mmol) were weighed and dissolved in tetrahydrofuran (60 mL). The reaction solution was refluxed for 2 hours under an argon atmosphere, and volatile components were then removed. The solid obtained was dissolved in methanol, and after passing of the solution through a strongly acidic ion exchange resin (Amberlyst 15JWET, manufactured by Organo Corporation), a weakly basic ion exchange resin (Amberlyst A21, manufactured by Organo Corporation) was added to the solution to be neutralized. The weakly basic ion exchange resin was filtered off and volatile components were removed to give 3-[(3-methoxypropyl)amino]propanesulfonic acid (A-3) (8.82 g, 41.7 mmol, 51%). $^1$H NMR (400 MHz, DMSO-d6) δ (ppm): 8.48 (br, 2H), 3.38 (t, J=6.0 Hz, 2H), 3.24 (s, 3H), 3.04 (m, 2H), 2.93 (m, 2H), 2.61 (m, 2H), 1.92 (m, 2H), 1.79 (m, 2H).

Synthesis Example 4

In a 200-mL flask equipped with a reflux tube, 1,3-propane sultone (6.72 g, 55.0 mmol) and hexylamine (8.00 mL, 60.5 mmol) were weighed and dissolved in tetrahydrofuran (60 mL). The reaction solution was refluxed for 2 hours under an argon atmosphere. After cooling to 25° C., a precipitated white precipitate was collected by filtration, washed with diethyl ether, and dried at 60° C. under reduced pressure to give 3-(hexylamino)propanesulfonic acid (A-4) (6.73 g, 30.1 mmol, 55%). $^1$H NMR (400 MHz, DMSO-d6) δ (ppm): 8.47 (br, 2H), 3.03 (t, J=6.8 Hz, 2H), 2.86 (m, 2H), 2.62 (m, 2H), 1.92 (m, 2H), 1.54 (m, 2H), 1.32-1.24 (m, 6H), 0.87 (t, J=7.0 Hz, 3H).

Synthesis Example 5

In a 200-mL flask equipped with a reflux tube, 1,3-propane sultone (6.11 g, 50.0 mmol), octylamine (8.53 mL, 51.5 mmol) and tetrahydrofuran (60 mL) were added to give 3-(octylamino) propanesulfonic acid (A-5) (6.35 g, 25.2 mmol, 51%) by the same method as in Synthesis Example 1. $^1$H NMR (400 MHz, DMSO-d6) δ (ppm): 8.40 (br, 2H), 3.03 (t, J=6.8 Hz, 2H), 2.86 (m, 2H), 2.61 (t, J=6.8 Hz, 2H), 1.92 (m, 2H), 1.54 (m, 2H), 1.30-1.24 (m, 10H), 0.86 (t, J=6.8 Hz, 3H).

Synthesis Example 6

In a 100-mL flask equipped with a reflux tube, 1,3,2-dioxathiane 2,2-dioxide (4.00 g, 29.0 mmol) and propylamine (2.65 mL, 31.9 mmol) were weighed, and dissolved in tetrahydrofuran (30 mL). The reaction solution was heated to reflux for 2 hours under an argon atmosphere, and volatile components were then removed. The solid obtained was dissolved in methanol, and diethyl ether was gradually added to precipitate a white precipitate. The precipitated white precipitate was collected by filtration, washed with diethyl ether, and dried at 60° C. under reduced pressure to give 3-(propylamino)propyl sulfate (A-6) (3.52 g, 17.9 mmol, 62%). $^1$H NMR (400 MHz, DMSO-d6) δ (ppm): 8.23 (br, 2H), 3.83 (t, J=6.1 Hz, 2H), 2.98 (tt, J=5.5, 7.2 Hz, 2H), 2.86 (tt, J=6.2, 7.6 Hz, 2H), 1.85 (tt, J=6.1, 7.2 Hz, 2H), 1.58 (tq, J=7.4, 7.6 Hz, 2H), 0.91 (t, 7.4 Hz, 3H).

Synthesis Example 7

In a 200-mL flask equipped with a reflux tube, 1,3,2-dioxathiane 2,2-dioxide (10.0 g, 72.4 mmol), (3-methoxypropyl)amine (8.20 mL, 80.1 mmol) and tetrahydrofuran (70 mL) were added to give 3-[(3-methoxypropyl)amino]propyl sulfate (A-7) (6.33 g, 27.9 mmol, 38%) by the same method as in Synthesis Example 3. $^1$H NMR (400 MHz, DMSO-d6) δ (ppm): 8.23 (br, 2H), 3.83 (t, J=6.1 Hz, 2H), 3.38 (t, J=6.0 Hz, 2H), 3.24 (s, 3H), 3.00-2.94 (m, 4H), 1.88-1.77 (m, 4H).

Synthesis Example 8

Into a 100-mL flask equipped with a reflux tube, 1,3,2-dioxathiane 2,2-dioxide (4.00 g, 29.0 mmol), n-hexylamine (4.30 mL, 32.5 mmol) and tetrahydrofuran (40 mL) were added to give 3-(hexylamino)propyl sulfate (A-8) (6.04 g, 25.2 mmol, 87%) by the same method as in Synthesis Example 6. $^1$H NMR (400 MHz, DMSO-d6) δ (ppm): 8.20 (br, 2H), 3.83 (t, J=6.1 Hz, 2H), 2.97 (m, 2H), 2.89 (m, 2H), 1.85 (tt, J=6.1, 7.3 Hz, 2H), 1.58 (tt, J=7.1, 7.5 Hz, 2H), 1.34-1.25 (m, 6H), 0.91 (t, 7.1 Hz, 3H).

Synthesis Example 9

Into a 200-mL flask equipped with a reflux tube, (3-methoxypropyl)amine (43.8 mL, 428 mmol) was dissolved in acetonitrile (60 mL), and 5-chloro-1-pentanol (10.5 g, 85.6 mmol) was added dropwise for 30 minutes while cooling with ice. The reaction solution was gradually heated to 25° C., and refluxed for 24 hours under an argon atmosphere. Volatile components were removed to obtain a solid, to which an aqueous potassium hydroxide solution (20 mass %, 120 mL), a saturated saline solution (120 mL) and diethyl ether (120 mL) were added to collect an organic phase after separation. Diethyl ether (60 mL) was added to the aqueous phase to collect an organic phase again after separation. The organic phase obtained was dried over sodium sulfate and the volatile components were removed under reduced pressure to give a crude product of 5-(3-methoxypropyl)amino-1-pentanol as a colorless viscous solid (15.0 g).
In a 200-mL flask equipped with a reflux tube, the crude product of 5-(3-methoxypropyl)amino-1-pentanol (15.0 g) obtained was dissolved in chloroform (70 mL), and thionyl chloride (8.1 mL, 110 mmol) was added dropwise thereto for 30 minutes while cooling with ice. The reaction solution was gradually warmed to 25° C. and then refluxed for 3 hours under an argon atmosphere. Water (30 mL) was added to the reaction solution, which was neutralized with sodium carbonate. To the solution, a saturated saline solution (50 mL) was added, and an organic phase was collected after separation. Chloroform (100 mL) was added to an aqueous phase, and an organic phase was collected again after separation. The organic phase obtained was dried over sodium sulfate, and then volatile components were removed to produce a brown solid. The brown solid obtained was dissolved in chloroform (20 mL), and then diethyl ether (100 mL) was gradually added to precipitate a white precipitate. The precipitated white precipitate was collected by filtration, washed with diethyl ether, and dried at 60° C. under reduced pressure to give N-(5-chloropentyl)-N-(3-methoxypropyl) amine hydrochloride (7.10 g, 30.8 mmol, 2 steps, 36%). $^1$H NMR (400 MHz, CDCl3) δ (ppm): 9.44 (br, 2H), 3.55 (t, J=6.4 Hz, 2H), 3.52 (t, J=5.7 Hz, 2H), 3.35 (s, 3H), 3.10 (m, 2H), 2.97 (m, 2H), 2.15 (m, 2H), 1.93 (m, 2H), 1.82 (m, 2H), 1.55 (m, 2H).

Synthesis Example 10

Into a 50-mL flask equipped with a reflux tube, N-(5-chloropentyl)-N-(3-methoxypropyl)amine hydrochloride (16.7 g, 72.6 mmol) obtained in Synthesis Example 9, sodium sulfite (18.3 g, 145 mmol) and water (60 mL) were added, and the mixture was refluxed for 48 hours under an argon atmosphere. After passing of the reaction solution through a strongly acidic ion exchange resin (Amberlyst 15JWET, manufactured by Organo Corporation), a weakly basic ion exchange resin (Amberlyst A21, manufactured by Organo Corporation) was added to the solution to be neutralized. The weakly basic ion exchange resin was filtered off and volatile components were removed to give 5-[(3-methoxypropyl)amino]pentanesulfonic acid (A-9) (8.05 g, 33.6 mmol, 46%). $^1$H NMR (400 MHz, DMSO-d6) δ (ppm): 8.32 (br, 2H), 3.38 (t, J=6.0 Hz, 2H), 3.24 (s, 3H), 2.92 (m, 2H), 2.87 (m, 2H), 2.44 (m, 2H), 1.83 (m, 2H), 1.63-1.53 (m, 4H), 1.41-1.33 (m, 2H).

Synthesis Example 11

In a 200-mL flask equipped with a reflux tube, (3-methoxypropyl)amine (25.6 mL, 250 mmol) was dissolved in acetonitrile (50 mL), and 8-chloro-1-octanol (8.23 g, 50 mmol) was added dropwise for 30 minutes while cooling with ice. The reaction solution was gradually heated to 25° C., and then refluxed for 24 hours under an argon atmosphere. The volatile components were removed under reduced pressure to give a crude product of 8-(3-methoxypropyl)amino-1-octanol as a white solid (11.0 g). The product was used in the next step without purification.
Subsequently, in a 100-mL flask equipped with a reflux tube, 8-(3-methoxypropyl)amino-1-octanol (11.0 g) obtained was dissolved in chloroform (30 mL), and thionyl chloride (4.8 mL, 66 mmol) was added dropwise for 30 minutes while cooling with ice. The reaction solution was gradually warmed to 25° C. and then refluxed for 1 hour under an argon atmosphere. Water (30 mL) was added to the reaction solution, which was neutralized with sodium carbonate. To the solution, a saturated saline solution (50 mL) was added, and an organic phase was collected after separation. Chloroform (100 mL) was added to an aqueous phase, and an organic phase was collected again after separation. The organic phase obtained was dried over sodium sulfate, and then volatile components were removed to give a brown solid. The brown solid obtained was recrystallized from chloroform/diethyl ether (100 mL), and a precipitated white precipitate was collected by filtration, washed with diethyl ether, and dried at 60° C. under reduced pressure to give a crude product of N-(8-chlorooctyl)-N-(3-methoxypropyl)amine hydrochloride (11.1 g).
Subsequently, in a 100-mL flask equipped with a reflux tube, N-(8-chlorooctyl)-N-(3-methoxypropyl)amine hydrochloride (11.1 g) obtained, sodium sulfite (10.28 g, 81.6 mmol), ethanol (20 mL) and water (80 mL) were weighed and refluxed under an argon atmosphere for 24 hours. After passing of the reaction solution through a strongly acidic ion exchange resin (Amberlyst 15JWET, manufactured by Organo Corporation), a weakly basic ion exchange resin (Amberlyst A21, manufactured by Organo Corporation) was added to the solution to be neutralized. The weakly basic ion exchange resin was filtered off and volatile components were removed to give a crude product. The crude product obtained was dissolved in methanol, and acetonitrile was gradually added to precipitate a white precipitate. The precipitated white precipitate was collected by filtration, washed with acetonitrile, and then dried at 60° C. under reduced pressure to give 8-[(3-methoxypropyl)amino]octanesulfonic acid (A-10) (9.74 g, 34.6 mmol, 3 steps, 69%). $^1$H NMR (400 MHz, DMSO-d6) δ (ppm): 8.23 (br, 2H), 3.38 (t, J=6.1 Hz, 2H), 3.24 (s, 3H), 2.93 (m, 2H), 2.88 (m, 2H), 2.38 (m, 2H), 1.81 (tt, J=6.1, 6.6 Hz, 2H), 1.60-1.51 (m, 4H), 1.35-1.23 (m, 8H).

Comparative Synthesis Example 1

In a 200-mL flask equipped with a reflux tube, hexylamine (33.0 mL, 250 mmol) was dissolved in acetonitrile (50 mL), and 8-chloro-1-octanol (8.23 g, 50 mmol) was added dropwise for 30 minutes while cooling with ice. The reaction solution was gradually heated to 25° C., and then refluxed for 24 hours under an argon atmosphere. The volatile components were removed under reduced pressure to give a crude product of 8-hexylamino-1-octanol as a white solid (13.4 g).
Subsequently, in a 100-mL flask equipped with a reflux tube, 8-hexylamino-1-octanol (13.4 g) obtained was dissolved in chloroform (30 mL), and thionyl chloride (4.8 mL, 66 mmol) was added dropwise for 30 minutes while cooling with ice. The reaction solution was gradually warmed to 25° C. and then refluxed for 1 hour under an argon atmosphere. Water (30 mL) was added to the reaction solution, which was neutralized with sodium carbonate. To the solution, a saturated saline solution (50 mL) was added, and an organic phase was collected after separation. Chloroform (100 mL) was added to an aqueous phase, and an organic phase was collected again after separation. The organic phase obtained was dried over sodium sulfate, and then volatile components were removed to give a brown solid. The brown solid obtained was dissolved in chloroform (20 mL), and then diethyl ether (100 mL) was gradually added to precipitate a white precipitate. The precipitated white precipitate was collected by filtration, washed with diethyl ether, and dried at 60° C. under reduced pressure to give a crude product of N-(8-chlorooctyl)-N-hexylamine hydrochloride (15.3 g).

Subsequently, in a 100-mL flask equipped with a reflux tube, N-(8-chlorooctyl)-N-hexylamine hydrochloride (15.3 g) obtained, sodium sulfite (12.6 g, 100 mmol), ethanol (20 mL) and water (80 mL) were weighed and refluxed under an argon atmosphere for 24 hours. After passing of the reaction solution through a strongly acidic ion exchange resin (Amberlyst 15JWET, manufactured by Organo Corporation), a weakly basic ion exchange resin (Amberlyst A21, manufactured by Organo Corporation) was added to the solution to be neutralized. The weakly basic ion exchange resin was filtered off and volatile components were removed to produce a crude product. The crude product obtained was dissolved in methanol, and acetonitrile was gradually added thereto to precipitate a white precipitate. The precipitated white precipitate was collected by filtration, washed with acetonitrile, and then dried at 60° C. under reduced pressure to give 8-(hexylamino)octanesulfonic acid (A-11) (3.76 g, 12.8 mmol, 3 steps, 26%). $^1$H NMR (400 MHz, DMSO-d6) δ (ppm): 8.46 (br, 2H), 2.94 (m, 2H), 2.89 (m, 2H), 2.83 (t, J=7.5 Hz, 2H), 1.86-1.72 (m, 6H), 1.48-1.25 (m, 14H), 0.86 (t, J=6.9 Hz, 3H).

[Production of Self-Emulsifying Polyisocyanate Composition]

Example 1-1

To a 1-L reaction vessel equipped with a stirrer, a thermometer, a condenser and a nitrogen gas introduction tube, Coronate HXLV (isocyanurate-modified polyisocyanate of hexamethylene diisocyanate, isocyanate content: 23.2 mass %, manufactured by Tosoh Corporation, 19.16 g), A-1 obtained in Synthesis Example 1 (0.54 g) and dimethylcyclohexylamine (0.38 g) were added and stirred at 80° C. for 5 hours to obtain a self-emulsifying polyisocyanate composition P-1. The isocyanate content of P-1 was 21.5 mass %. The isocyanate content means the mass fraction of the isocyanate group in the organic polyisocyanate (b) based on the total mass of a self-emulsification polyisocyanate composition.

Examples 1-2 to 1-10 and Comparative Example 1

Self-emulsifying polyisocyanate compositions P-2 to P-11 were synthesized by the same method as in Example 1-1 except that the compositions were changed to those shown in the following tables.

TABLE 1

| | Example 1-2 | Example 1-3 | Example 1-4 | Example 1-5 | Example 1-6 |
|---|---|---|---|---|---|
| Composition name | P-2 | P-3 | P-4 | P-5 | P-6 |
| Coronate HXLV (g) | 19.03 | 18.99 | 18.95 | 18.87 | 19.03 |
| A-2 (g) | 0.59 | — | — | — | — |
| A-3 (g) | — | 0.63 | — | — | — |
| A-4 (g) | — | — | 0.67 | — | — |
| A-5 (g) | — | — | — | 0.75 | — |
| A-6 (g) | — | — | — | — | 0.59 |
| Dimethylcyclohexylamine (g) | 0.38 | 0.38 | 0.38 | 0.38 | 0.38 |

TABLE 1-continued

| | Example 1-2 | Example 1-3 | Example 1-4 | Example 1-5 | Example 1-6 |
|---|---|---|---|---|---|
| hexylamine (g) | | | | | |
| Total (g) | 20.00 | 20.00 | 20.00 | 20.00 | 20.00 |
| Isocyanate content (mass %) | 21.5 | 21.4 | 21.4 | 21.3 | 21.4 |

TABLE 2

| | Example 1-7 | Example 1-8 | Example 1-9 | Example 1-10 | Comparative Example 1-1 |
|---|---|---|---|---|---|
| Composition name | P-7 | P-8 | P-9 | P-10 | p-11 |
| Coronate HXLV (g) | 18.94 | 18.90 | 18.90 | 18.78 | 18.74 |
| A-7 (g) | 0.68 | — | — | — | — |
| A-8 (g) | — | 0.72 | — | — | — |
| A-9 (g) | — | — | 0.72 | — | — |
| A-10 (g) | — | — | — | 0.84 | — |
| A-11 (g) | — | — | — | — | 088 |
| Dimethylcyclohexylamine (g) | 0.38 | 0.38 | 0.38 | 0.38 | 0.38 |
| Total (g) | 20.00 | 20.00 | 20.00 | 20.00 | 20.00 |
| Isocyanate content (mass %) | 21.3 | 21.3 | 21.3 | 21.2 | 21.1 |

Dimethylcyclohexylamine: a special grade reagent, manufactured by Tokyo Chemical Industry Co., Ltd.

<Preparation of Coating Material Composition for Evaluation on Gloss and Hardness>

A main agent (acrylic emulsion WE-303, manufactured by DIC Corporation, solid content: 45 mass %, hydroxyl value: 84 (mg-KOH/g) in terms of solid content) and the self-emulsifying polyisocyanate compositions P-1 To P-11 obtained were compounded to have a molar ratio of isocyanate group/hydroxyl group=1.5. Water was added to the compounded solution to have a total solid content of 40 mass %, and the mixture was stirred at a high-speed of 2000 rpm for 30 seconds using a homomixer to obtain a coating material composition for evaluation on the gloss and the hardness.

<Preparation of Coating Film for Evaluation on Gloss and Hardness>

Each of the coating material composition for evaluation on gloss and hardness was applied to a steel plate with an applicator, and cured for 1 week in an atmosphere at a temperature of 25° C., so that a coating film having a dry film thickness of 40 μm was formed.

<Gloss Testing>

The gloss at 20° of each coating film obtained above was measured using Micro-TRI-gross manufactured by BYK. The results are shown in Tables 3 and 4. Having a gloss at 20° of 80 or more can be evaluated as excellent.

<Hardness Testing>

The Martens hardness of each coating film obtained above was measured using HM-2000 manufactured by Fischer Instruments K.K. The results are shown in Tables 3 and 4. Having a Martens hardness of 100 (N/mm$^2$) or more at 25° C. can be evaluated as good.

<Evaluation on Stability of Water Dispersion>

Each of the self-emulsifying polyisocyanate compositions (P-1 to P-11) and water were mixed at a mass ratio of 1:9, and stirred at 2000 rpm for 1 minute to prepare an aqueous dispersion, which was allowed to stand at 25° C. for 1 hour, and the dispersion state at that time was visually evaluated. The results are shown in Tables 3 and 4.

No separation or precipitation: A
With precipitation observed: C

TABLE 3

|  | Example 1-1 | Example 1-2 | Example 1-3 | Example 1-4 | Example 1-5 | Example 1-6 |
|---|---|---|---|---|---|---|
| Composition name | P-1 | P-2 | P-3 | P-4 | P-5 | P-6 |
| Stability of water dispersion | A | A | A | A | A | A |
| Gloss at 20° (numerical value) | 85 | 86 | 87 | 81 | 80 | 85 |
| Martens hardness (N/m²) | 104 | 103 | 101 | 102 | 104 | 103 |

TABLE 4

|  | Example 1-7 | Example 1-8 | Example 1-9 | Example 1-10 | Comparative Example 1-1 |
|---|---|---|---|---|---|
| Composition name | P-7 | P-8 | P-9 | P-10 | P-11 |
| Stability of water dispersion | A | A | A | A | C |
| Gloss at 20° (numerical value) | 86 | 83 | 85 | 85 | 76 |
| Martens hardness (N/m²) | 101 | 101 | 101 | 102 | 95 |

It was shown that in the case where an anionic compound having a total carbon number of 6 or more and less than 14 (A-1 to A-10) was used, the stability of water dispersion was superior in comparison with the case where an anionic compound (A-11) was used. Furthermore, it was shown that coating materials made from the self-emulsifying polyisocyanate compositions in Examples were excellent in gloss and hardness.

[Production of Self-Emulsifying Polyisocyanate Composition]

Example 2-1

A reaction vessel having a capacity of 0.1 L equipped with a stirrer, a thermometer, a condenser and a nitrogen gas introduction tube was charged with 28.84 g of an organic polyisocyanate (polyisocyanate containing an isocyanurate of hexamethylene diisocyanate, trade name: Coronate HXLV, isocyanate content: 23.2 mass %, manufactured by Tosoh Corporation), 0.68 g of A-1 obtained in Synthesis Example 1 and 0.48 g of dimethylcyclohexylamine, and the mixture was stirred at 80° C. for 5 hours to produce a self-emulsifying polyisocyanate composition P-1. The sulfo group content in P-12 was 0.125 mmol/g, and the isocyanate content was 21.8 mass %.

Examples 2-2 to 2-10 and Comparative Example 2-1

Self-emulsifying polyisocyanate compositions P-13 to P-23 were synthesized by the same method as in Example 2-1, except that the compositions were changed to those shown in the following tables.

TABLE 5

|  | Example 2-2 | Example 2-3 | Example 2-4 | Example 2-5 | Example 2-6 | Example 2-7 | Comparative Example 2-1 |
|---|---|---|---|---|---|---|---|
| Composition name | P-13 | P-14 | P-15 | P-16 | P-17 | P-18 | P-19 |
| Coronate HXLV (g) | 28.61 | 27.22 | 28.98 | 27.97 | 26.45 | 28.42 | 26.34 |
| A-1 (g) | 0.82 | 1.63 | — | — | — | — | — |
| A-3 (g) | — | — | 0.63 | 1.27 | 2.22 | — | — |

TABLE 5-continued

|  | Example 2-2 | Example 2-3 | Example 2-4 | Example 2-5 | Example 2-6 | Example 2-7 | Comparative Example 2-1 |
|---|---|---|---|---|---|---|---|
| A-4 (g) | — | — | — | — | — | 1.00 | — |
| CAPS (g) | — | — | — | — | — | — | 2.32 |
| Dimethylcyclohexylamine (g) | 0.57 | 1.15 | 0.38 | 0.76 | 1.34 | 0.57 | 1.34 |
| Total (g) | 30.0 | 30.0 | 30.0 | 30.0 | 30.0 | 30.0 | 30.0 |
| Sulfo group content (mmol/g) | 0.15 | 0.30 | 0.10 | 0.20 | 0.35 | 0.15 | 0.35 |
| Isocyanate content (mass %) | 21.5 | 19.8 | 22.0 | 20.8 | 19.0 | 21.4 | 18.9 |

TABLE 6

|  | Example 2-8 | Example 2-9 | Example 2-10 | Comparative Example 2-2 |
|---|---|---|---|---|
| Composition name | P-20 | P-21 | P-22 | P-23 |
| Coronate HXR (g) | 28.98 | 27.97 | 26.45 | 28.43 |
| A-3 (g) | 0.63 | 1.27 | 2.22 | — |
| CAPS (g) | — | — | — | 1.00 |
| Dimethylcyclohexylamine (g) | 0.38 | 0.76 | 1.34 | 0.57 |
| Total (g) | 30.0 | 30.0 | 30.0 | 30.0 |
| Sulfo group content (mmol/g) | 0.10 | 0.20 | 0.35 | 0.15 |
| Isocyanate content (mass %) | 20.6 | 19.5 | 17.8 | 20.0 |

Coronate HXR (trade name): polyisocyanate containing isocyanurate of hexamethylene diisocyanate, isocyanate content: 21.8 mass %, manufactured by Tosoh Corporation CAPS: cyclohexylaminopropane sulfonic acid, manufactured by Tokyo Chemical Industry Co., Ltd.

<Evaluation on Viscosity>

The viscosity of the self-emulsifying polyisocyanate compositions (P-12 to P-23) was measured using a B-type viscosity measuring device (Viscometer TV-22 manufactured by TOKI SANGYO Co. LTD). The viscosity was measured at 25° C. The results are shown in Tables 7 to 9.

<Evaluation on Particle Size>

Each of the self-emulsifying polyisocyanate compositions (P-12 to P-23) and purified water were weighed at a mass ratio of 1:9 (self-emulsifying polyisocyanate composition: purified water) in a 30 ml sample bottle to have a total amount of about 15 mL, and shaken up and down 60 times in 20 seconds after sealing. The particle size of the aqueous dispersion obtained was evaluated with a particle size measuring device (ELSZ-200 manufactured by Otsuka Electronics). The results are shown in Tables 7 to 9. With a particle size of the aqueous dispersion of 250 nm or less, the stability of water dispersion can be evaluated as good and the gloss of the coating film can be evaluated as good.

<Evaluation on Degree of Water Dispersion>

Each of the self-emulsifying polyisocyanate compositions (P-12 to P-23) and purified water were precisely weighed at a mass ratio of 1:9 (self-emulsifying polyisocyanate composition:purified water) in a 30 ml sample bottle with a known weight to have a total amount of about 15 mL, and shaken up and down 60 times by hand in 20 seconds after sealing. The mixture was then left standing, and the self-emulsifying polyisocyanate composition dispersed in water was removed together with water to measure the mass of the self-emulsifying polyisocyanate composition remaining without dispersing in water. Using these measured values, the degree of water dispersion was determined based on the following equation for evaluation.

$$\text{Degree of water dispersion (\%)} = (B)/(A) \times 100 \quad \text{[Equation 1]}$$

In the equation, (A) represents the mass (g) of the self-emulsifying polyisocyanate composition before shaking with water, and (B) represents the value (g) obtained by subtracting the mass of the self-emulsifying polyisocyanate composition remaining without dispersing in water from the mass (g) of the self-emulsifying polyisocyanate composition before shaking with water.

The results are shown in Tables 7 to 9. Having a degree of water dispersion of 80% or more can be evaluated as good.

TABLE 7

|  | Example 2-1 | Example 2-2 | Example 2-3 | Example 2-4 |
|---|---|---|---|---|
| Composition name | P-12 | P-13 | P-14 | P-15 |
| Viscosity (mPa · s) | 3440 | 2990 | 7130 | 1730 |
| Degree of water dispersion (%) | 94.2 | 94.9 | 86.9 | 90.6 |
| Particle size (nm) | 209 | 168 | 108 | 238 |

TABLE 8

|  | Example 2-5 | Example 2-6 | Example 2-7 | Comparative Example 2-1 |
|---|---|---|---|---|
| Composition name | P-16 | P-17 | P-18 | P-19 |
| Viscosity (mPa · s) | 3800 | 8640 | 2980 | 29400 |
| Degree of water dispersion (%) | 83.2 | 84.9 | 95.4 | 40.2 |
| Particle size (nm) | 145 | 134 | 182 | 46 |

TABLE 9

|  | Example 2-5 | Example 2-6 | Example 2-7 | Comparative Example 2-2 |
|---|---|---|---|---|
| Composition name | P-20 | P-21 | P-22 | P-23 |
| Viscosity (mPa · s) | 3800 | 7310 | 31740 | 6400 |
| Degree of water dispersion (%) | 92.0 | 88.7 | 85.0 | 82.6 |
| Particle size (nm) | 22.7 | 200 | 68 | 3247 |

Any of the particle size of the dispersions obtained by dispersing the self-emulsifying polyisocyanate compositions in water in Examples is 250 nm or less, which indicates that the self-emulsifying polyisocyanate compositions of Examples are excellent in stability of water dispersion. In other words, it has been shown that the self-emulsifying polyisocyanate compositions in Examples are excellent in the degree of water dispersion and the stability of water dispersion.

The invention claimed is:

1. A self-emulsifying polyisocyanate composition comprising a reaction product of an anionic compound represented by the following formula (1) and an organic polyisocyanate:

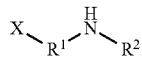 (1)

wherein X represents a sulfo group or a hydroxysulfonyloxy group, $R^1$ represents a straight-chain or branched alkylene group, and $R^2$ represents a straight-chain or branched alkyl group; the total number of carbon atoms included in $R^1$ and $R^2$ is 6 or more and less than 14, and one or more carbon atoms in the groups $R^1$ and $R^2$ are optionally replaced with an oxygen atom(s), wherein the self-emulsifying polyisocyanate composition further comprising an amine compound.

2. The self-emulsifying polyisocyanate composition according to claim 1, wherein a mass fraction of an isocyanate group in the organic polyisocyanate is 10 to 35% based on the total mass of the self-emulsifying polyisocyanate composition.

3. The self-emulsifying polyisocyanate composition according to claim 1, wherein the organic polyisocyanate comprises an isocyanurate-modified polyisocyanate of hexamethylene diisocyanate.

4. A coating material composition comprising a mixture of the self-emulsifying polyisocyanate composition according to claim 1 and a main agent.

5. A coating film formed from the coating material composition according to claim 4.

* * * * *